(12) United States Patent
Wright et al.

(10) Patent No.: US 11,499,508 B2
(45) Date of Patent: Nov. 15, 2022

(54) CLEANING SYSTEM FOR AN ENGINE EXHAUST COOLER

(71) Applicant: Transportation IP Holdings, LLC, Norwalk, CT (US)

(72) Inventors: David Wright, Decatur, TX (US); David Baldwin, Erie, PA (US); Justin Iacovetto, Erie, PA (US); Scott Moore, St. Paul Park, MN (US); Jody Motichka, Kansas City, KS (US); Eric David Peters, Lawrence Park, PA (US); Paul Gerard Nistler, Arvada, CO (US)

(73) Assignee: Transportation IP Holdings, LLC, Norwalk, CT (US)

( * ) Notice: Subject to any disclaimer, the term of this patent is extended or adjusted under 35 U.S.C. 154(b) by 38 days.

(21) Appl. No.: 16/985,988

(22) Filed: Aug. 5, 2020

(65) Prior Publication Data

US 2021/0047988 A1 Feb. 18, 2021

Related U.S. Application Data

(60) Provisional application No. 62/886,838, filed on Aug. 14, 2019.

(51) Int. Cl.
| | | |
|---|---|---|
| *F02M 26/09* | (2016.01) | |
| *F02M 26/30* | (2016.01) | |
| *F02B 29/04* | (2006.01) | |
| *F02M 26/35* | (2016.01) | |

(52) U.S. Cl.
CPC ......... *F02M 26/09* (2016.02); *F02B 29/0406* (2013.01); *F02M 26/30* (2016.02); *F02M 26/35* (2016.02); *F02D 2200/08* (2013.01)

(58) Field of Classification Search
CPC ........ F02M 26/09; F02M 26/30; F02M 26/35; F02M 25/07; F02M 25/0706; F02M 25/0737; F02M 25/0738; F02B 29/04; F02B 29/0406; F02D 2200/08
USPC ............ 123/568.11–568.32; 60/605.1, 605.2
See application file for complete search history.

(56) References Cited

U.S. PATENT DOCUMENTS

| | | |
|---|---|---|
| 2003/0037774 A1 | 2/2003 | Schweinzer et al. |
| 2004/0182373 A1 | 9/2004 | Li et al. |
| 2007/0039321 A1 | 2/2007 | Scheidler et al. |
| 2009/0101122 A1 | 4/2009 | Kurtz et al. |
| 2010/0051001 A1 | 3/2010 | Webb et al. |
| 2010/0107631 A1 | 5/2010 | Pearson |
| 2011/0131979 A1 | 6/2011 | Ryan et al. |
| 2012/0048216 A1 | 3/2012 | Tomazic et al. |
| 2013/0000619 A1 | 1/2013 | Ewen |
| 2013/0087127 A1 | 4/2013 | Piper et al. |

(Continued)

*Primary Examiner* — John Kwon
*Assistant Examiner* — Johnny H Hoang
(74) *Attorney, Agent, or Firm* — Christopher R. Carroll; The Small Patent Law Group LLC

(57) ABSTRACT

A system and method operate by, while an engine is operating, automatically determining whether the engine is in a designated state for EGR cooler cleaning. The EGR cooler is operably coupled to the engine to receive hot EGR from an exhaust of the engine and to provide cooled EGR to an intake of the engine. The system and method also include, responsive to the engine not being in the designated state, automatically preventing a water pump system from introducing a cleaning liquid into a gas inlet of the EGR cooler.

20 Claims, 2 Drawing Sheets

(56) References Cited

U.S. PATENT DOCUMENTS

2016/0131088 A1\* 5/2016 Styles ................... F02M 26/04
123/568.12

\* cited by examiner

CLEANING SYSTEM FOR AN ENGINE EXHAUST COOLER

CROSS-REFERENCE TO RELATED APPLICATIONS

This application claims priority to U.S. Provisional Application No. 62/886,838, which was filed on 14 Aug. 2019, and the entire disclosure of which is incorporated herein by reference.

BACKGROUND

Many vehicles have engines that consume fuel to propel the vehicles. Some of these engines are exhaust gas recirculating (EGR) engines that recirculate at least some of exhaust generated by cylinders of the engine back into one or more of these cylinders of the engine. The exhaust usually is cooled by flowing through an EGR cooler prior to being directed back into cylinders of the engine to ensure that the exhaust is not too hot for being re-used by the cylinders as inlet gas.

EGR coolers can accumulate buildup of mass from the exhaust. This mass buildup can clog or otherwise interfere with operation of the EGR coolers such that the EGR coolers are not able to cool the exhaust gas as effectively as the coolers can with less mass buildup. Currently, EGR coolers are cleaned of mass buildup by dismantling the engine, or at least part of an EGR system that includes the EGR cooler. This can involve substantial downtime of the engine, and can be a time- and labor-intensive process.

BRIEF DESCRIPTION

In one embodiment, a method includes (while an engine is operating) automatically determining whether the engine is in a designated state for EGR cooler cleaning. The EGR cooler is operably coupled to the engine to receive hot EGR from an exhaust of the engine and to provide cooled EGR to an intake of the engine. The method also includes (responsive to the engine not being in the designated state) automatically preventing a water pump system from introducing a cleaning liquid into a gas inlet of the EGR cooler.

In one embodiment, another method includes determining whether an EGR cooler meets a designated cleaning threshold and, while an engine is operating, automatically determining whether the engine is in a designated state for EGR cooler cleaning. The EGR cooler is operably coupled to the engine to receive hot EGR from an exhaust of the engine and to provide cooled EGR to an intake of the engine. The method also includes, responsive to the EGR cooler meeting the designated cleaning threshold and the engine being in the designated state, introducing, with a water pump system, a cleaning liquid into a gas inlet of the EGR cooler. An amount of the cleaning liquid relative to an amount of the hot EGR entering the EGR cooler is below a level that would cause hydro-lock of the engine and, responsive to the engine not being in the designated state, automatically preventing the water pump system from introducing the cleaning liquid into the gas inlet of the EGR cooler.

In one embodiment, a system includes one or more conduits configured to be fluidly coupled with a cooling device that is operably coupled with an engine to cool at least a portion of exhaust from the engine, a pump system configured to pump a cleaning fluid from a cleaning fluid source through the one or more conduits and into a flow path of the at least a portion of exhaust from the engine while the engine continues to operate, and a controller configured to monitor operation of the engine and determine whether the engine is operating in a designated state. The controller is configured to control the pump system to pump the cleaning fluid into the flow path of the at least a portion of exhaust from the engine to clean the cooling device while the engine continues to operate in the designated state and the at least a portion of exhaust flows from the engine and through the cooling device.

BRIEF DESCRIPTION OF THE DRAWINGS

The inventive subject matter will be better understood from reading the following description of non-limiting embodiments, with reference to the attached drawings, wherein below.

DETAILED DESCRIPTION

The inventive subject matter described herein includes an engine cleaning system and method that cleans a cooling device of the engine while the engine is operating. In one embodiment, the cooling device is an EGR cooler of an EGR system of the engine. The engine is operating in that the engine is consuming fuel and air to generate power. For example, the engine may be operating at a designated throttle setting, such as a maximum throttle setting. Alternatively, the engine can be operating at another throttle setting. The cleaning of the cooling device may occur while the EGR cooler and/or EGR system remain coupled with the engine and while the engine is operating. The engine can use pressure generated by exhaust of the engine (e.g., turbo boost pressure) to control the introduction of a cleaning fluid (e.g., a cleaning liquid) into the cooling device. This can prevent or reduce the risk of hydro-locking the engine. For example, the higher or maximum throttle setting can generate pressure that forces the cleaning fluid through and out of the cooling device without the cleaning fluid remaining in the engine or cooling device (e.g., the fluid does not remain in an air intake of the engine).

The systems and methods described herein allow for the cooling device to remain coupled to the engine during cleaning. In one example, the cleaning fluid is water, which allows for steam cleaning of the cooling device. The heated exhaust can flash evaporate the water into steam that cleans the cooling device. This can avoid the use of solvents or other cleaning materials that can require specialized or costly disposal methods.

Figure 1:
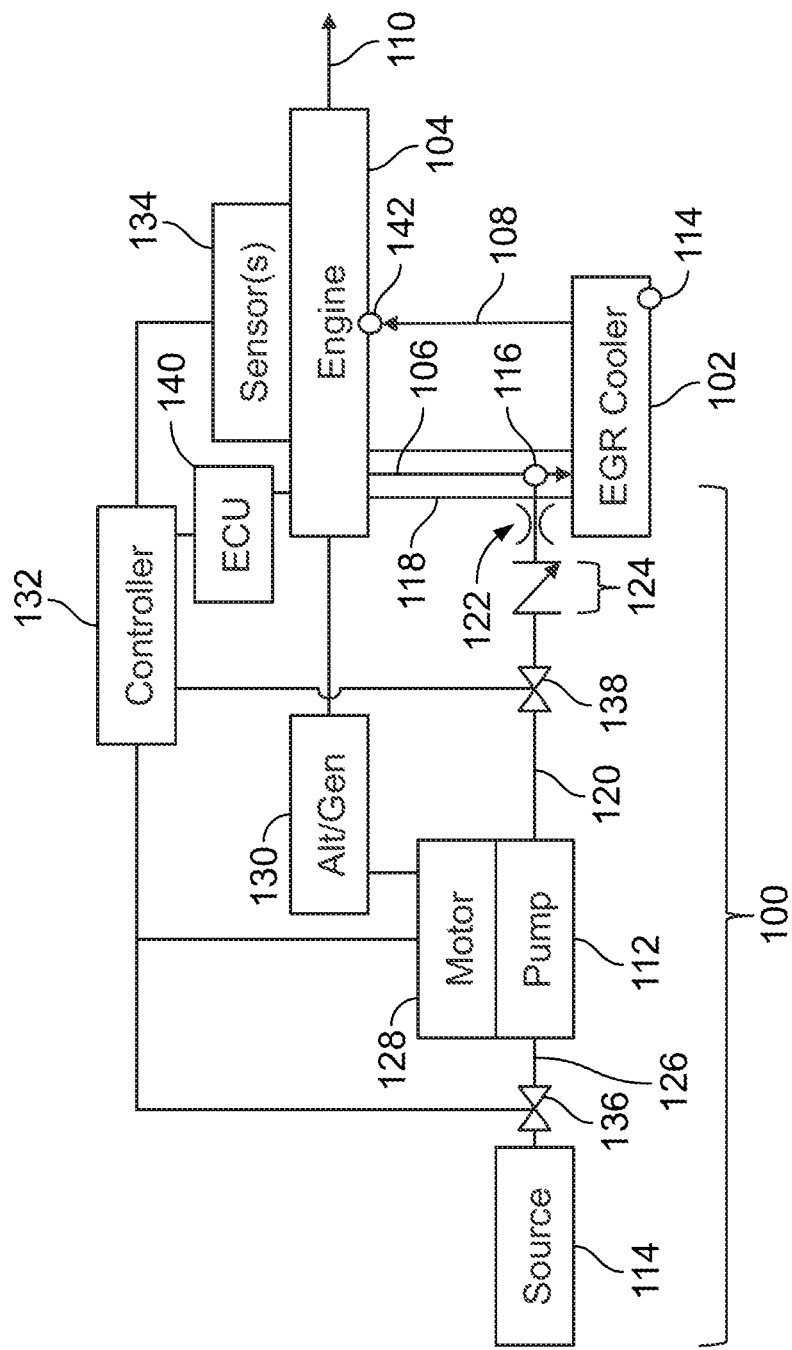
FIG. 1 illustrates one embodiment of a cleaning system for a cooling device of an engine.

FIG. 1 illustrates one embodiment of a cleaning system 100 for a cooling device 102 of an engine 104. The cleaning system 100 operates to clean a cooling device 102 ("EGR Cooler" in FIG. 1) that is operably coupled with an engine 104, such as a fuel consuming engine (e.g., a gasoline, diesel, or natural gas engine). Although the cooling device 102 is labeled as an EGR cooler in FIG. 1, the cooling device 102 can be another device that cools exhaust from the engine 104 (e.g., without directing the cooled exhaust back to the engine 104, as described herein), or a device that cools charge air or intake air, for example (e.g., a post-compressor charge air cooler). For example, the cooling device 102 can be used to suppress sparks or wildfire fires from the engine 104.

The cooling device 102 can be part of or can represent an EGR system that receives at least one portion 106 of exhaust gas from the engine 104, cools the received portion 106 of exhaust gas to a temperature that is cooler than the temperature of the received portion 106 of exhaust, and recirculates this received portion 106 of exhaust gas back to the engine 104 (e.g., via an intake manifold) as recirculated exhaust gas 108. This recirculated exhaust gas 108 can then be used as part of the air consumed during combustion cycles of the engine 104. For example, the recirculated exhaust gas 108 can be directed into an intake 142 of the engine 104, such as an intake air manifold of the engine 104. Another portion 110 of exhaust gas from the engine 104 may not be directed to the cooling device 102. This portion 110 of the exhaust may be expelled to the ambient environment. Alternatively, all or substantially all (e.g., at least 95%) of the exhaust gas from the engine is directed to the cooling device 102.

The cooling device 102 can include or represent a conduit (e.g., a pipe) having corrugations that provide surface area over which heat is transferred from the received portion 106 of exhaust gas to cool this gas into the recirculated exhaust gas 108. Optionally, the cooling device 102 can include or represent a conduit that directs the received portion 106 of exhaust gas into an enclosure having fins or other objects that increase the surface area over which heat is transferred away from the received portion 106 of the exhaust gas. The cooling device 102 can include conduits that direct a coolant (e.g., water, a fluid engine coolant, etc.) into thermal contact with the fins or other surfaces of the enclosure where the received portion 106 of exhaust gas flows. This coolant can help draw thermal energy (e.g., heat) away from the received portion 106 of the exhaust gas. The cooling device 102 can be formed from a thermally conductive material, such as metal. The cooling device 102 is operably coupled with the engine 104 in that one or more conduits direct the portion 106 of exhaust gas from the engine 104 to the cooling device 102 and one or more other, separate conduits direct the recirculated exhaust gas 108 back to the engine 104.

The cleaning system 100 can be fluidly coupled with the cooling device 102 in a location that is downstream of the engine 104 and upstream of the cooling device 102 along the path in which the portion 106 of the exhaust gas flows from the engine 104 to the cooling device 102. For example, a conduit 118 that fluidly couples the engine 104 with the cooling device 102 to direct the portion 106 of exhaust gas from the engine 104 to the cooling device 102 may include a port, valve, or other connection 116. Optionally, the cooling device 102 may include the port, valve, or other connection 116 to fluidly couple the cleaning system 100. The cleaning system 100 can be fluidly coupled with the cooling device 102 via this port, valve, or other connection 116. In one embodiment, the connection 116 is a port for a sensor with the sensor removed from the port (e.g., temporarily removed). The conduit 118 can serve as or fluidly couple with a gas inlet of the cooling device 102.

In the illustrated embodiment, the cleaning system 100 includes one or more conduits 120 that extend between and fluidly couple a pump system 112 ("Pump" in FIG. 1) with the connection 116. These conduits 120 can include and/or be coupled with a nozzle 122 that couples with and/or is inserted into the connection 116. The nozzle 122 represents the outlet through which the cleaning fluid is output from the cleaning system 100 into the cooling device 102. The nozzle 122 can be a fixed orifice nozzle, such as a nozzle of a power washer. Optionally, the nozzle 122 can be a variable orifice nozzle. In another embodiment, the nozzle 122 is not included and the conduits 120 are coupled with the connection 116.

The conduits 120 can include and/or be connected with one or more check valves 124 that allow for the flow of cleaning fluid from the pump system 112 toward the cooling device 102 but that block the flow of cleaning fluid (and other fluids) in the reverse direction (e.g., from the cooling device 102 toward the pump system 112). Optionally, the check valve 124 is not included.

The pump system 112 represents one or more pumps that are powered to draw cleaning fluid from a source 114 and force the cleaning fluid through the conduits 120 and into the cooling device 102. The source 114 can be a container or other supply of the cleaning fluid. For example, if the cleaning fluid is water, the source 114 can be a container of water, a connection to a water line, or the like. If the cleaning fluid is another fluid (e.g., a detergent, a solvent, etc.), then the source 114 can be a container of the fluid. The pump system 112 can be fluidly coupled with the source 114 by one or more additional conduits 126.

The pump system 112 can be powered by one or more motors 128. These motors 128 can be powered by the engine 104. For example, the motors 128 can receive and be powered by electric current that is received from an alternator or generator 130 ("Alt/Gen" in FIG. 1) that is powered by the engine 104. Alternatively, the motors 128 can be powered by another source of current and/or the pump system 112 can be powered in another way (e.g., by a connection with the engine 104, connection with another engine, or the like).

Optionally, one or more valves 136, 138 may be included in the cleaning system 100 to control the flow of the cleaning fluid to the pump system 112 from the source 114 and/or to control the flow of the cleaning fluid from the pump system 112 to the cooling device 102. For example, an upstream valve 136 may be located in and/or coupled with the conduits 126 in a location between the source 114 and the pump system 112. The upstream valve 136 can be manually closed to prevent the cleaning fluid from being drawn from the source 114 to the pump system 112. The upstream valve 136 can be manually opened to allow the cleaning fluid to be drawn from the source 114 to the pump system 112. In one example, the upstream valve 136 can include or be coupled with a motor that automatically opens or closes the valve 136 based on a control signal received from the controller 132. The controller 132 can issue the control signal to open or close the valve 136 as needed (as described herein).

A downstream valve 138 may be located in and/or coupled with the conduits 120 in a location between the pump system 112 and the cooling device 102. The downstream valve 138 can be manually closed to prevent the cleaning fluid from being pumped from the pump system 112 to the cooling device 102. The downstream valve 138 can be manually opened to allow the cleaning fluid to be pumped from the pump system 112 to the cooling device 102. In one example, the downstream valve 138 can include or be coupled with a motor that automatically opens or closes the valve 138 based on a control signal received from the controller 132. The controller 132 can issue the control signal to open or close the valve 138 as needed (as described herein).

The cleaning system 100 can determine whether the engine 104 is operating in a designated state for cleaning of the cooling device 102. This determination can be made by a controller 132, which represents hardware circuitry that includes and/or is connected with one or more processors (e.g., one or more microprocessors, one or more field programmable gate arrays, and/or one or more integrated circuits). The controller 132 is shown in FIG. 1 as being connected with one or more other components described herein. These connections with the controller 132 can represent wired and/or wireless communication paths. For example, the controller 132 and connected components can include and/or be connected with communication devices that communicate data signals via the communication paths. These communication devices can include transceiving hardware, such as antennas, modems, transceivers, transmitters, etc.

The controller 132 can monitor a speed at which the engine 104 is operating, a throttle setting of the engine 104, a pressure of exhaust that is output by the engine 104, and/or a power output of the engine 104. The controller 132 can monitor one or more of these output characteristics of the engine 104 by receiving data or signals output by one or more sensors 134. The sensor 134 can represent a crank position sensor, a manifold pressure sensor (e.g., a manifold absolute pressure sensor), a throttle position sensor, or the like. The controller 132 can determine engine speeds based on how quickly the engine crank is moving as measured by the crank position sensor (with faster crank movements associated with faster engine speeds), can determine engine power outputs based on the manifold pressures measured by the manifold pressure sensor (with greater pressures indicating greater power outputs), and/or can determine greater throttle positions based on outputs of the throttle position sensor.

The controller 132 can compare the output characteristic or characteristics that is or are monitored with a threshold or with a designated characteristic. Based on this comparison, the controller 132 can determine whether the engine 104 is operating in a designated state for cleaning the cooling device 102. For example, the controller 132 can determine whether the engine speed is at least as fast (or is faster) than a designated speed threshold, whether the engine power output is at least as great (or is greater) than a designated power output threshold, whether the throttle position is at least as great (or is greater) than a designated throttle position. Faster engine speeds, greater engine power outputs, and/or greater throttle positions (or settings) can indicate that the engine 104 is generating more exhaust pressure (relative to slower engine speeds, reduced engine power outputs, and/or lower throttle positions or settings). The thresholds can be determined or selected based on which exhaust pressures prevent cleaning fluid from remaining or collecting within the engine 104 and/or cooling device 102. For example, the thresholds can be empirically determined based on trial and error examination of whether cleaning fluid remains in the engine 104 and/or cooling device 102 after cleaning while the engine 104 operates in various different states.

Optionally, the controller 132 can determine whether the engine 104 is operating in the designated state by determining whether the engine 104 is operating in a full EGR state. The controller 132 can determine that the engine 104 is operating in the full EGR state if the engine 104 is operating at a speed above a designated threshold speed (e.g., a designated revolutions per minute), if the engine 104 is operating at or above a designated throttle level or setting, and if the engine 104 is currently activated for EGR operation. The engine 104 can be activated for EGR operation automatically by the controller 132, by an engine control unit (ECU) 140 of the engine 104, or by an operator of the engine 104. Additionally or alternatively, the controller 132 can determine that the engine 104 is operating in the full EGR state if a communication link between the controller 132 and the engine 104 (or between the controller 132 and the ECU) meets one or more designated operability conditions and if the engine 104 is in a designated readiness condition. The one or more designated operability conditions can be met when the controller 132 can successfully communicate (e.g., exchange messages) with one or more of the engine 104, the ECU of the engine 104, the sensors 134, the motor 128, and/or the pump system 112 and/or when each of these components can communicate with the controller 132 to indicate that each component is activated. The engine 104 can be in the designated readiness condition when the engine 104 is operating at or above the designated engine speed, is generating at least the designated power output, and/or is operating at a throttle setting at least as great as the threshold setting and/or the maximum throttle setting.

If the engine 104 is operating in the designated state, the controller 132 can direct the motor(s) 128 to activate and power the pump system 112 to draw and force (e.g., pump) the cleaning fluid from the source 114 toward the cooling device 102. The cleaning fluid enters into the cooling device 102 and cleans mass buildup from inside the cooling device 102. For example, the cleaning fluid can be flash heated (e.g., quickly heated to cause evaporation of the fluid into a vapor form), such as by converting water into steam. The steam passes into and through the cooling device 102 to remove mass buildup inside the cooling device 102. The removed buildup and remaining vapor of the cleaning fluid can flow back into the engine 104 with the cooled recirculated exhaust gas 108. The engine 104 operating in the designated state produces hot exhaust that burns up, eliminates, or modifies the removed buildup and/or remaining vapor in such a way that the portion 110 of the exhaust gas expelled from the engine 104 to the ambient environment meets relevant environmental regulations in the jurisdictions in which the engine 104 is intended to be run or does run. Alternatively, the cooling device 102 or other component can include a valve, port, or drain 144 that is opened to allow the removed buildup and/or remaining vapor (or condensed vapor) to exit from the cooling device 102).

If the engine 104 is not operating in the designated state, the controller 132 does not direct the motor(s) 128 to activate and power the pump system 112 to pump the cleaning fluid from the source 114 toward the cooling device 102. This can prevent the cooling system 100 from introducing the cleaning fluid into the cooling device 102 while the exhaust from the engine 104 is too cool to flash heat the cleaning fluid and/or remove the mass buildup. Otherwise, the cleaning fluid may remain in the cooling device 102 and/or engine 104, and cause hydro-lock in the engine 104. The controller 132 can wait and repeatedly check to see whether the engine 104 begins and/or remains operating in the designated state before activating the pump system 112.

Optionally, instead of not activating the pump system 112 to prevent introduction of cleaning fluid into the cooling device 102, the controller 132 can deactivate (e.g., de-power or otherwise turn off) the pump system 112. The controller 132 may automatically change a state of one or more of the valves 136, 138 to control (or prevent) the flow of the cleaning fluid into the cooling device 102. For example, responsive to determining that the engine 104 is not operating in the designated state, the controller 132 can automatically close the downstream valve 138. This can prevent cleaning fluid from being introduced into the cooling device 102. One or more vents or additional check valves can be included in or coupled with the conduits 120 downstream of the pump system 112 to allow cleaning fluid in the conduits 120 to be removed from the conduits 120 if the pump system 112 remains active while the downstream valve 138 is closed.

Closing the downstream valve 138 after at least some cleaning fluid is introduced into the cooling device 102 can allow the cleaning fluid to be heated by the portion 106 of the exhaust gas and clean the cooling device 102 while preventing additional cleaning fluid to be introduced into the cooling device 102. A substantial portion of the cleaning fluid that was in the pump system 112 and/or conduits 120, 126 after closing the downstream valve 138 can be prevented from entering the cooling device 102. This substantial portion can include more than whatever cleaning fluid is in the pump system 112, such as the cleaning fluid in the conduits 120, 126 after closing the downstream valve 138.

The amount of cleaning fluid that is introduced into the conduit 118 may be restricted by control of the pump system 112 and/or valves 136, 138 by the controller 132. For example, the controller 132 can operate the pump system 112 to only pump an amount of the cleaning fluid into the conduit 118 that can be consumed (e.g., burned up) or expelled out with the expelled portion 110 of exhaust gas without leaving cleaning fluid in the engine 104 that hydrolocks the engine 104.

In one example, the controller 132 automatically controls operation of the pump system 112 to control the flow of the cleaning fluid into the cooler device 102 only while the engine 104 is operating in the designated state. Alternatively, the pump system 112 can be manually controlled to pump the cleaning fluid into the cooling device 102 while the engine 104 is operating in the designated state (as determined by an operator of the system 100).

The pump system 112 can be controlled to clean the cooling device 102 while the engine 104 is stationary. For example, the pump system 112 can be coupled with the cooling device 102 by the conduits 120 (as described herein) after a vehicle containing the engine 104 is brought into a shop, garage, or other facility, or is otherwise stationary and not moving. This version of the cleaning system 100 can be referred to as an off-board system as the cleaning system 100 may not be carried onboard the vehicle during travel. Optionally, the cleaning system 100 may be an onboard system that remains coupled with the engine 104 even while the vehicle powered by the engine 104 continues to move. The vehicle may carry the components of the cleaning system 100 shown in FIG. 1. Optionally, compressed air (from an onboard air compressor) can be controlled to drive the cleaning fluid into the cooling device 102. The onboard cleaning system 100 can operate to clean the cooling device 102 while the engine 104 is operating to move the vehicle.

The controller 132 can automatically determine when to clean the cooling device 102, regardless of whether the cleaning system 100 is an onboard or off-board system. Optionally, the controller 132 can direct cleaning of the cooling device 102 based on or responsive to operator input.

The controller 132 may determine whether to clean the cooling device 102 based on an operational effectiveness measure and a designated cleaning threshold of the cooling device 102. The operational effectiveness measure can be a quantifiable measurement of how well the cooling device 102 is operating to cool the received portion 106 of exhaust gas. For example, one or more of the sensors 134 may be measure manifold air temperatures of the engine 104. The controller 132 may monitor these temperatures to determine whether the temperature difference between the received portion 106 of exhaust gas and the recirculated portion 108 of exhaust gas that is cooled by the cooling device 102 is decreasing. This can indicate that the cooling device 102 is less effective at cooling the exhaust gas. Additionally or alternatively, one or more of the sensors 134 may be measure manifold air pressures of the engine 104. The controller 132 may monitor these pressures to determine whether the pressure difference between the received portion 106 of exhaust gas and the recirculated portion 108 of exhaust gas that is cooled by the cooling device 102 is increasing. This can indicate that the cooling device 102 is less effective at cooling the exhaust gas, potentially due to clogging of the cooling device 102 by mass buildup. The temperature difference, temperature of the recirculated portion 108 of exhaust gas, the pressure difference, etc., can be the operational effectiveness measure of the cooling device 102.

Responsive to the operational effectiveness measure of the cooling device 102 exceeding or not exceeding a threshold (as described herein), the controller 132 may automatically initiate cleaning of the cooling device 102 (once the engine 104 is operating in the designated state, as described above). This threshold can be the designated cleaning threshold and can be associated with values of the operational effectiveness measure that indicate that the cooling device 102 needs cleaning. For example, responsive to the temperature difference between the portions 106, 108 of exhaust gas exceeding a designated temperature difference threshold, the controller 132 may initiate cleaning of the cooling device 102 the next time the engine 104 operates in the designated state. In another example, responsive to the temperature of the recirculated portion 108 of exhaust gas exceeding a designated temperature threshold, the controller 132 may initiate cleaning of the cooling device 102 the next time the engine 104 operates in the designated state. As another example, responsive to the pressure difference between the portions 106, 108 of exhaust gas exceeding a designated pressure difference threshold, the controller 132 may initiate cleaning of the cooling device 102 the next time the engine 104 operates in the designated state. As another example, responsive to the pressure of the recirculated portion 108 of exhaust gas dropping below (or no longer exceeding) a designated pressure threshold, the controller 132 may initiate cleaning of the cooling device 102 the next time the engine 104 operates in the designated state.

The controller 132 can alternate between directing cleaning fluid to be pumped into the cooling device 102 and preventing the cleaning fluid from being pumped into the cooling device 102. For example, during a first designated time period, the controller 132 can activate the pump system 112 and ensure that the valves 136, 138 are open so that cleaning fluid is pumped into the cooling device 102. This first designated time period can last for a time period that is based on the operational effectiveness measure of the cooling device 102. For example, the first designated time period can be empirically determined based on different operational effectiveness measures of the same or other cooling devices 102 before and after the cleaning fluid is introduced into the same or other cooling device 102 for different periods of time. The period of time that is found to improve the operational effectiveness measure more than one or more (or all) other time periods can be the first designated time period.

Following expiration of the first designated time period, the controller 132 can stop the flow of more cleaning fluid into the cooling device 102 (as described herein) for a second designated time period. This second time period can allow for the cleaning fluid to be consumed by the hot exhaust 106 or otherwise expelled from the engine 104 as part of the exhaust 110. This second time period also can be determined empirically using the same or another engine 104 and/or cooling device 102. The controller 132 can then (following expiration of the second time period) automatically re-determine whether the cooling device 102 meets the designated cleaning threshold. If the cooling device 102 still meets the designated cleaning threshold and the engine 104 is operating in the designated state for cleaning of the cooling device 102, then the controller 132 can automatically control the pump system 112 and/or the valves 136, 138 to introduce additional cleaning fluid into the cooling device 102 for additional cleaning of the cooling device 102. This process can be repeated one or more times until the cooling device 102 no longer meets the designated cleaning threshold (e.g., due to the operational effectiveness measure of the cooling device 102 no longer indicating that the cooling device 102 needs cleaning).

Figure 2:
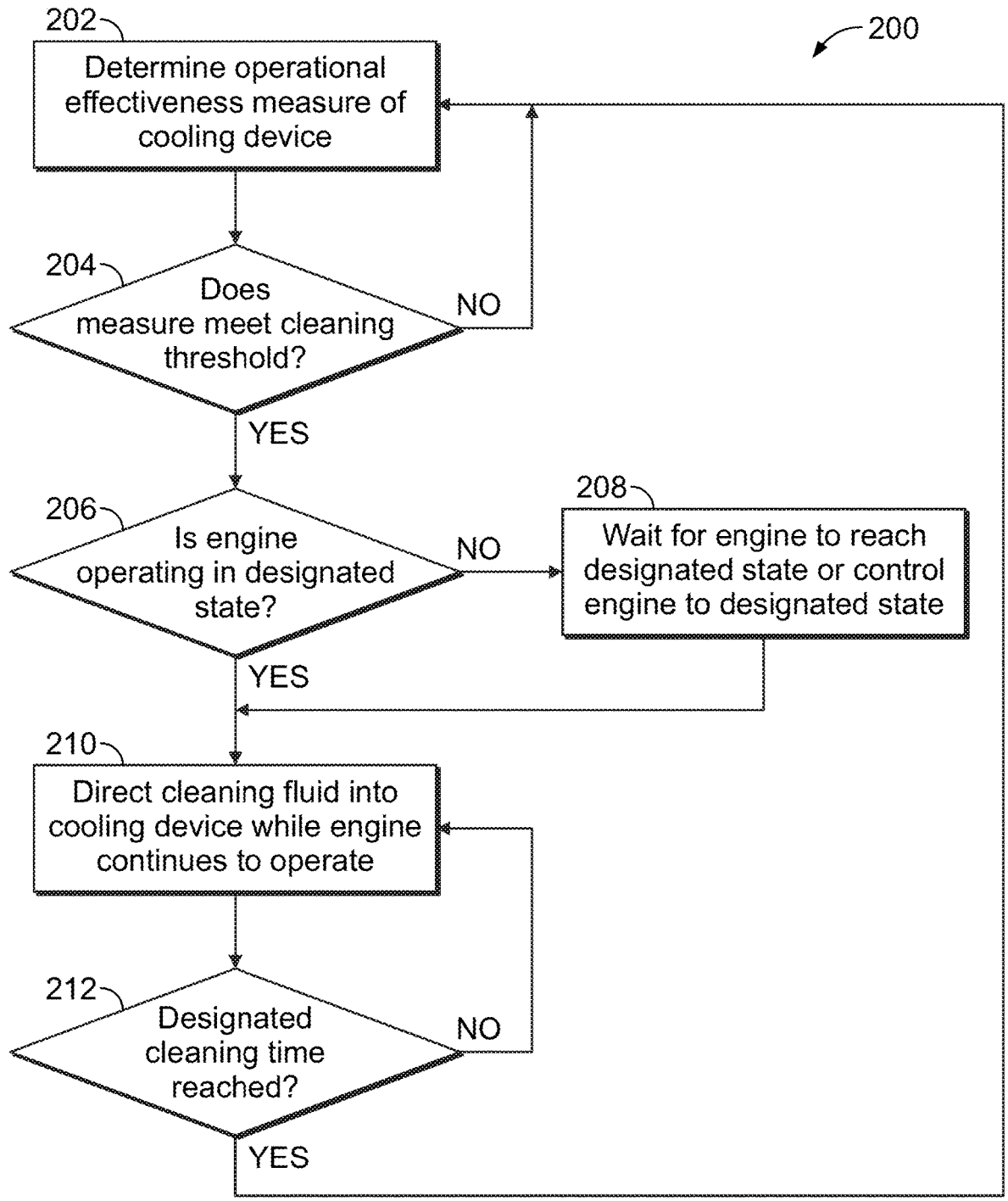
FIG. 2 illustrates a flowchart of one embodiment of a method for cleaning a cooling device of an engine while the engine continues to operate.

FIG. 2 illustrates a flowchart of one embodiment of a method 200 for cleaning a cooling device of an engine while the engine continues to operate (e.g., run). The method 200 can describe the operations performed by the cleaning system 100. In one embodiment, the cleaning system 100 can automatically perform the operations described in connection with the method 200. Alternatively, one or more of the operations of the method 200 can be manually performed and/or verified.

At 202, an operational effectiveness measure of the cooling device 102 is determined. As described above, this can be a measurement of how effectively the cooling device 102 is cooling a portion 106 of the hot exhaust that is received by the cooling device 102 from the engine 104. Optionally, the operational effectiveness measure can indicate an amount of usage and/or elapsed time since the cooling device 102 was last cleaned. For example, the operational effectiveness measure can be a length of time and/or number of duty cycles performed by the engine 104 since the cooling device 102 was last cleaned, and/or a length of time that it has been since the cooling device 102 was last cleaned.

At 204, a determination is made as to whether the operational effectiveness measure meets a cleaning threshold. The controller 132 can compare the measure with the threshold to determine whether the cooling device 102 needs to be cleaned. For example, if the cooling device 102 is not cooling the portion 106 of the received exhaust by a sufficient amount, if the pressure drop through the cooling device 102 is too large, if it has been longer than a designated time period since the cooling device 102 was last cleaned, if the engine 104 and/or cooling device 102 have been used a longer amount of time or a greater number of cycles than a designated time period or designated duty cycle threshold, etc., then the measure indicates that the cooling device 102 needs cleaning. As a result, flow of the method 200 can proceed toward 206. Otherwise, flow of the method 200 can return toward 202. The method 200 can return toward 202 to continue monitoring operation of the engine 104 and/or cooling device 102 to determine when cleaning is or may be needed.

At 206, a determination is made as to whether the engine 104 is operating in a designated state. As described above, the engine 104 operating in this designated state can ensure that the pressure and/or temperature of the received portion 106 of the exhaust is great and/or hot enough to flash heat and move the vapor of the cleaning fluid through the cooling device 102 and the engine 104 without hydro-locking the engine 104. If the controller 132 determines that the engine 104 is operating in the designated state, then the cleaning fluid can safely be introduced into the exhaust flow path of the engine 104 and cooling device 102. As a result, flow of the method 200 can proceed toward 210. But, if the engine 104 is not operating in the designated state, then introducing cleaning fluid into the exhaust flow path of the engine 104 and cooling device 102 could result in damage to the engine 104. As a result, flow of the method 200 can proceed toward 208.

At 208, the method 200 waits for the engine 104 to change states to the designated state or automatically changes operation of the engine 104 to the designated state. For example, the controller 132 may wait to activate the pump system 112 and/or open the valve(s) 136 and/or 138 until the engine 104 operates in the designated state. Optionally, the controller 132 can send a control signal to the engine 104 (or to the ECU of the engine 104) to change operational settings of the engine 104 to drive the engine 104 to operate in the designated state. For example, the controller 132 can direct the ECU 140 to increase a throttle setting, engine speed, or the like, of the engine 104 until the engine 104 is operating in the designated state. In another example, the controller 132 can display or cause display of an instruction (e.g., a light, sound, or alpha-numeric string) on an electronic display device to notify an operator to change one or more settings of the engine 104 to cause the engine 104 to operate in the designated state.

At 210, cleaning fluid is directed into the cooling device 102 while the engine 104 continues to operate. The controller 132 can activate the pump system 112 and/or open the valves 136, 138 to cause cleaning fluid to be directed into the flow of exhaust gas entering the cooling device 102 from the engine 104. As described above, this exhaust gas can heat the cleaning fluid into a vapor that removes mass buildup and otherwise cleans the interior of the cooling device 102. The removed mass buildup and/or remaining vapor can be consumed by the engine 104 and/or expelled out as the portion 110 of the exhaust from the engine 104.

In one embodiment, the amount of cleaning fluid that is directed into the cooling device 102 while the engine 104 operates is controlled to be less than a designated amount. For example, the controller 132 can control the pump system 112 to keep the flow rate of the cleaning fluid into the cooling device 102 to be no greater than a designated flow rate threshold. Cleaning fluid flow rates that exceed this threshold can cause a crank case overpressure event to occur from the cleaning fluid going from the combustion chamber past the piston rings into the crankcase, boiling off as steam, and overwhelming a vapor evacuation system of the engine 104. The controller 132 can select the cleaning solution flow rate to work both with no manifold drain (e.g., where lower flow rates are used) or with either a manual or auto manifold drain (e.g., where faster flow rates are used).

At 212, a determination is made as to whether the cleaning fluid has been flowing into the cooling device 102 for a designated cleaning time. If the cleaning fluid has been directed into the cooling device 102 for at least the designated cleaning time, then cleaning of the cooling device 102 may be complete. But, the effectiveness of the cleaning may need to be checked before cleaning is terminated. As a result, flow of the method 200 can return toward 202. This can result in a feedback loop where the effectiveness of the cleaning and the operative state of the engine 104 are checked before initiating another cleaning of the engine 104 at 210. If the cleaning time has not been reached, then flow of the method 200 can return from 212 to 210 to continue cleaning. Once the cleaning time is reached and the operational effectiveness measure of the cooling device 102 indicates that the cooling device 102 is clean, operation of the method 200 can terminate.

In one embodiment, a method includes, while an engine is operating, automatically determining whether the engine is in a designated state for exhaust gas recirculation (EGR) cooler cleaning. The EGR cooler is operably coupled to the engine to receive hot EGR from an exhaust of the engine and to provide cooled EGR to an intake of the engine. The method also includes, responsive to the engine not being in the designated state, automatically preventing a water pump system from introducing a cleaning liquid into a gas inlet of the EGR cooler.

Optionally, the method includes determining whether the EGR cooler meets a designated cleaning threshold and, responsive to the EGR cooler meeting the designated cleaning threshold and the engine being in the designated state, introducing, with the water pump system, the cleaning liquid into the gas inlet of the EGR cooler. An amount of the cleaning liquid relative to an amount of the hot EGR entering the EGR cooler may be below a level that would cause hydro-lock of the engine.

Optionally, determining if the EGR cooler meets the designated cleaning threshold includes automatically determining an effectiveness of the EGR cooler and determining whether the effectiveness is below a designated effectiveness level.

Optionally, automatically determining whether the engine is in the designated state for EGR cooler cleaning comprises determining whether the engine is operating in a full EGR state.

Optionally, the engine is determined to be in the full EGR state based on whether the engine is operating above a designated threshold RPM, whether the engine is at or above a designated throttle level, and whether the engine is currently activated for EGR operation.

Optionally, the engine is determined to be in the full EGR state when a communication link meets one or more designated operability conditions and when the engine is in a designated readiness condition.

Optionally, the gas inlet is an EGR inlet line upstream of an interior gas section of the EGR cooler, and the cleaning liquid is introduced into the EGR inlet line through a sensor port from which a sensor has been temporarily removed.

Optionally, automatically preventing the water pump system from introducing the cleaning liquid into the gas inlet of the EGR cooler comprises at least one of de-powering a water pump portion of the water pump system, preventing the water pump from activating, or automatically controlling a valve of the water pump system to a closed position where a substantial portion of the cleaning liquid is prevented from exiting the water pump system for introduction into the gas inlet.

Optionally, the cleaning liquid is introduced into the gas inlet for designated first time period, and the method further comprises, at the end of the first time period, running the engine without introduction of the cleaning liquid into the gas inlet for a designated second time period and, at the end of the second time period, automatically re-determining whether the EGR cooler meets the designated cleaning threshold and whether the engine is in the designated state for EGR cooler cleaning, and responsive thereto, introducing, with the water pump system, further cleaning liquid into the gas inlet of the EGR cooler.

In one embodiment, another method includes determining whether an EGR cooler meets a designated cleaning threshold and, while an engine is operating, automatically determining whether the engine is in a designated state for EGR cooler cleaning. The EGR cooler is operably coupled to the engine to receive hot EGR from an exhaust of the engine and to provide cooled EGR to an intake of the engine. The method also includes, responsive to the EGR cooler meeting the designated cleaning threshold and the engine being in the designated state, introducing, with a water pump system, a cleaning liquid into a gas inlet of the EGR cooler. An amount of the cleaning liquid relative to an amount of the hot EGR entering the EGR cooler is below a level that would cause hydro-lock of the engine and, responsive to the engine not being in the designated state, automatically preventing the water pump system from introducing the cleaning liquid into the gas inlet of the EGR cooler.

In one embodiment, a system includes one or more conduits configured to be fluidly coupled with a cooling device that is operably coupled with an engine to cool at least a portion of exhaust from the engine, a pump system configured to pump a cleaning fluid from a cleaning fluid source through the one or more conduits and into a flow path of the at least a portion of exhaust from the engine while the engine continues to operate, and a controller configured to monitor operation of the engine and determine whether the engine is operating in a designated state. The controller is configured to control the pump system to pump the cleaning fluid into the flow path of the at least a portion of exhaust from the engine to clean the cooling device while the engine continues to operate in the designated state and the at least a portion of exhaust flows from the engine and through the cooling device.

Optionally, the system also includes one or more valves connected with or disposed in the one or more conduits. The controller is configured to control positions of the one or more valves to control flow of the cleaning fluid into the flow path of the at least a portion of exhaust from the engine.

Optionally, the controller is configured to determine that the engine is operating in the designated state based on a throttle setting of the engine being at or above a designated throttle setting.

Optionally, the controller is configured to determine that the engine is operating in the designated state based on a speed of the engine being at or above a designated speed.

Optionally, the controller is configured to determine that the engine is operating in the designated state based on a pressure of the exhaust from the engine being at or above a designated pressure.

Optionally, the controller is configured to determine that the engine is operating in the designated state based on a temperature of the exhaust from the engine being at or above a designated temperature.

Optionally, the controller is configured to determine an operational effectiveness measure of the cooling device and to control the pump system to pump the cleaning fluid into the flow path of the at least a portion of exhaust while the engine continues to operate in the designated state and based on the operational effectiveness measure of the cooling device.

Optionally, the operational effectiveness measure of the cooling device indicates a cooling effectiveness of the cooling device on the at least a portion of exhaust received from the engine.

Optionally, the operational effectiveness measure of the cooling device indicates a pressure drop of the at least a portion of exhaust from the engine across the cooling device.

Optionally, the one or more conduits are temporarily coupled with the cooling device while the engine is operating.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are example embodiments. Many other embodiments will be apparent to one of ordinary skill in the art upon reviewing the above description. The scope of the inventive subject matter should, therefore, be determined with reference to the appended clauses, along with the full scope of equivalents to which such clauses are entitled. In the appended clauses, the terms "including" and "in which" are used as the plain-English equivalents of the respective terms "comprising" and "wherein." Moreover, in the following clauses, the terms "first," "second," and "third," etc. are used merely as labels, and are not intended to impose numerical requirements on their objects. Further, the limitations of the following clauses are not written in means-plus-function format and are not intended to be interpreted based on 35 U.S.C. § 112(f), unless and until such clause limitations expressly use the phrase "means for" followed by a statement of function void of further structure.

This written description uses examples to disclose several embodiments of the inventive subject matter, including the best mode, and also to enable one of ordinary skill in the art to practice the embodiments of inventive subject matter, including making and using any devices or systems and performing any incorporated methods. The patentable scope of the inventive subject matter is defined by the clauses, and may include other examples that occur to one of ordinary skill in the art. Such other examples are intended to be within the scope of the clauses if they have structural elements that do not differ from the literal language of the clauses, or if they include equivalent structural elements with insubstantial differences from the literal languages of the clauses.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, or the like). Similarly, the programs may be stand-alone programs, may be incorporated as subroutines in an operating system, may be functions in an installed software package, or the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "comprises," "including," "includes," "having," or "has" an element or a plurality of elements having a particular property may include additional such elements not having that property.

What is claimed is:

1. A method comprising:
   while an engine is operating, automatically determining whether one or more of a speed, a power output, or a throttle setting of the engine is at or above a designated threshold for cleaning of an exhaust gas recirculation (EGR) cooler, the EGR cooler operably coupled to the engine to receive hot EGR from an exhaust of the engine and to provide cooled EGR to an intake of the engine; and
   responsive to the one or more of the speed, the power output, or the throttle setting of the engine not being at or above the designated threshold, automatically preventing a water pump system from introducing a cleaning liquid into a gas inlet of the EGR cooler.

2. The method of claim 1, further comprising:
   determining whether the EGR cooler meets a designated cleaning threshold, the designated cleaning threshold determined by one or more of a temperature difference between a first portion and a second portion of exhaust gas exceeding a designated threshold, a pressure difference between the first portion and the second portion of exhaust gas exceeding a designated pressure difference threshold, or a pressure of a recirculated portion of exhaust gas dropping below a designated pressure threshold; and
   responsive to the EGR cooler meeting the designated cleaning threshold and the one or more of the speed, the power output, or the throttle setting of the engine being at or above the designated threshold, introducing, with the water pump system, the cleaning liquid into the gas inlet of the EGR cooler.

3. The method of claim 2, wherein determining whether the EGR cooler meets the designated cleaning threshold comprises:
   automatically determining an effectiveness of the EGR cooler; and
   determining whether the effectiveness is below a designated effectiveness level.

4. The method of claim 2, wherein automatically determining whether the engine is operating at or above the designated threshold for EGR cooler cleaning comprises determining whether the engine is operating in a full EGR state.

5. The method of claim 4, wherein the engine is determined to be in the full EGR state based on whether the engine is operating at or above a designated threshold RPM, whether the engine is at or above a designated throttle level, and whether the engine is currently activated for EGR operation.

6. The method of claim 5, wherein the engine is determined to be in the full EGR state when a communication link meets one or more designated operability conditions and when the engine is in a designated readiness condition.

7. The method of claim 2, wherein the gas inlet is an EGR inlet line upstream of an interior gas section of the EGR cooler, and the cleaning liquid is introduced into the EGR inlet line through a sensor port from which a sensor has been temporarily removed.

8. The method of claim 2, wherein automatically preventing the water pump system from introducing the cleaning liquid into the gas inlet of the EGR cooler comprises at least one of de-powering a water pump portion of the water pump system, preventing the water pump from activating, or automatically controlling a valve of the water pump system to a closed position where a substantial portion of the cleaning liquid is prevented from exiting the water pump system for introduction into the gas inlet.

9. The method of claim 2, wherein the cleaning liquid is introduced into the gas inlet for designated first time period, and the method further comprises, at the end of the first time period:
   running the engine without introduction of the cleaning liquid into the gas inlet for a designated second time period; and
   at the end of the second time period, automatically re-determining whether the EGR cooler meets the designated cleaning threshold and whether the engine is at or above the designated threshold for EGR cooler cleaning, and responsive thereto, introducing, with the water pump system, further cleaning liquid into the gas inlet of the EGR cooler.

10. The method of claim 1, further comprising:
    determining whether an EGR cooler meets a designated cleaning threshold; and
    responsive to the EGR cooler meeting the designated cleaning threshold and the engine being at or above the designated threshold, introducing, with a water pump system, a cleaning liquid into a gas inlet of the EGR cooler.

11. A method comprising:
    while an engine is operating, automatically determining whether one or more of a speed, a power output, or a throttle setting of the engine is at or above a designated threshold for cleaning of an exhaust gas recirculation (EGR) cooler, the EGR cooler is operably coupled to the engine to receive hot EGR from an exhaust of the engine and to provide cooled EGR to an intake of the engine;
    responsive to the one or more of the speed, the power output, or the throttle setting of the engine not being at or above the designated threshold, automatically preventing a water pump system from introducing a cleaning liquid into a gas inlet of the EGR cooler;
    determining whether the EGR cooler meets a designated cleaning threshold, the designated cleaning threshold determined by one or more of a temperature difference between a first portion and a second portion of exhaust gas exceeding a designated threshold, a pressure difference between the first portion and the second portion of exhaust gas exceeding a designated pressure difference threshold, or a pressure of a recirculated portion of exhaust gas dropping below a designated pressure threshold;
    responsive to the EGR cooler meeting the designated cleaning threshold and the one or more of the speed, the power output, or the throttle setting of the engine being at or above the designated threshold, introducing, with the water pump system, the cleaning liquid into the gas inlet of the EGR cooler, the cleaning liquid introduced into the gas inlet for a designated first time period;
    running the engine without introduction of the cleaning liquid into the gas inlet for a designated second time period after an end of the first time period; and
    at the end of the second time period, automatically re-determining whether the EGR cooler meets the designated cleaning threshold and whether one or more of the speed, the power output, or the throttle setting of the engine is at or above the designated threshold for EGR cooler cleaning, and responsive thereto, introducing, with the water pump system, further cleaning liquid into the gas inlet of the EGR cooler.

12. The method of claim 11, wherein determining if the EGR cooler meets the designated cleaning threshold comprises:
    automatically determining an effectiveness of the EGR cooler; and
    determining whether the effectiveness is below a designated effectiveness level.

13. The method of claim 11, wherein automatically determining whether the engine is at or above the designated threshold for EGR cooler cleaning comprises determining whether the engine is operating in a full EGR state.

14. The method of claim 13, wherein the engine is determined to be in the full EGR state based on whether the engine is operating above a designated threshold RPM, whether the engine is at or above a designated throttle level, and whether the engine is currently activated for EGR operation.

15. The method of claim 14, wherein the engine is determined to be in the full EGR state when a communication link meets one or more designated operability conditions and when the engine is in a designated readiness condition.

16. The method of claim 11, wherein the gas inlet is an EGR inlet line upstream of an interior gas section of the EGR cooler, and the cleaning liquid is introduced into the EGR inlet line through a sensor port from which a sensor has been temporarily removed.

17. The method of claim 11, wherein automatically preventing the water pump system from introducing the cleaning liquid into the gas inlet of the EGR cooler comprises at least one of de-powering a water pump portion of the water pump system, preventing the water pump from activating, or automatically controlling a valve of the water pump system to a closed position where a substantial portion of the cleaning liquid is prevented from exiting the water pump system for introduction into the gas inlet.

18. The method of claim 11, wherein the cleaning liquid is introduced into the gas inlet for designated first time period, and the method further comprises, at the end of the first time period:
    running the engine without introduction of the cleaning liquid into the gas inlet for a designated second time period; and
    at the end of the second time period, automatically re-determining whether the EGR cooler meets the designated cleaning threshold and whether the engine is at or above the designated threshold for EGR cooler cleaning, and responsive thereto, introducing, with the water pump system, further cleaning liquid into the gas inlet of the EGR cooler.

19. A system comprising:
    a controller configured to automatically determine whether one or more of a speed, a power output, or a throttle setting of an operating engine is at or above a designated threshold for cleaning of an exhaust gas recirculation (EGR) cooler, the EGR cooler operably coupled to the engine to receive hot EGR from an exhaust of the engine and to provide cooled EGR to an intake of the engine, the controller also configured to automatically prevent a water pump system from introducing a cleaning liquid into a gas inlet of the EGR cooler responsive to the one or more of the speed, the power output, or the throttle setting of the engine not at or above the designated threshold.

20. The system of claim 19, wherein the controller is configured to determine whether the EGR cooler meets a designated cleaning threshold, the designated cleaning threshold determined by one or more of a temperature difference between a first portion and a second portion of exhaust gas exceeding a designated threshold, a pressure difference between the first portion and the second portion of exhaust gas exceeding a designated pressure difference threshold, or a pressure of a recirculated portion of exhaust gas dropping below a designated pressure threshold.

\* \* \* \* \*